(12) United States Patent
Reed

(10) Patent No.: US 8,087,856 B2
(45) Date of Patent: Jan. 3, 2012

(54) DOUBLE HELIX THREAD CUTTING TAP

(76) Inventor: Gary J. Reed, Turlock, CA (US)

( * ) Notice: Subject to any disclaimer, the term of this patent is extended or adjusted under 35 U.S.C. 154(b) by 1138 days.

(21) Appl. No.: 11/903,295

(22) Filed: Sep. 21, 2007

(65) Prior Publication Data
US 2008/0075550 A1 Mar. 27, 2008

Related U.S. Application Data

(60) Provisional application No. 60/846,674, filed on Sep. 22, 2006.

(51) Int. Cl.
*B23G 5/06* (2006.01)

(52) U.S. Cl. ............ 408/222; 408/215; 470/198

(58) Field of Classification Search .......... 408/215–218, 408/222; 470/198, 199; *B23G 5/06*
See application file for complete search history.

(56) References Cited

U.S. PATENT DOCUMENTS

| | | | | | |
|---|---|---|---|---|---|
| D30,485 | S | * | 4/1899 | Prentiss | D15/139 |
| 1,508,595 | A | * | 9/1924 | Brubaker, Jr. | 76/115 |
| 2,342,143 | A | * | 2/1944 | Howe | 408/224 |
| 2,387,375 | A | * | 10/1945 | Whyland | 411/311 |
| 3,328,814 | A | * | 7/1967 | Hudson | 408/220 |
| 3,863,316 | A | * | 2/1975 | Yeo | 407/54 |
| 3,913,196 | A | * | 10/1975 | Maday | 407/54 |
| 4,227,837 | A | * | 10/1980 | Yodoshi | 407/53 |
| 4,271,554 | A | * | 6/1981 | Grenell | 470/204 |
| 4,395,167 | A | * | 7/1983 | Maternus | 407/54 |
| 7,144,208 | B2 | * | 12/2006 | Henderer et al. | 408/144 |
| 2008/0069653 | A1 | * | 3/2008 | Glimpel et al. | 408/193 |

FOREIGN PATENT DOCUMENTS

| | | | | |
|---|---|---|---|---|
| DE | 2331927 | A | * | 1/1975 |
| JP | 57107718 | A | * | 7/1982 |
| JP | 58181508 | A | * | 10/1983 |
| JP | 59205210 | A | * | 11/1984 |
| JP | 59205211 | A | * | 11/1984 |
| JP | 60094210 | A | * | 5/1985 |
| JP | 01171725 | A | * | 7/1989 |
| JP | 2000198010 | A | * | 7/2000 |
| SU | 422553 | A | * | 9/1974 |

\* cited by examiner

*Primary Examiner* — Eric A Gates
(74) *Attorney, Agent, or Firm* — Audrey A. Millemann; Weintraub Genshlea Chediak

(57) ABSTRACT

The invention includes a double helix thread cutting tap with both right-handed and left-handed helical chip removal flutes. The double helix thread cutting tap places a positive rake angle on all sets of thread cutting teeth for optimum performance and minimal cutting pressure.

25 Claims, 3 Drawing Sheets

DOUBLE HELIX THREAD CUTTING TAP

CROSS-REFERENCE TO RELATED APPLICATIONS

Pursuant to 35 U.S.C. §119(e), this application claims priority to U.S. provisional patent application No. 60/846,674, filed Sep. 22, 2006, the entire disclosure of which is incorporated herein by reference.

FIELD OF THE INVENTION

This invention relates generally to a device for tapping threads into various substrates with a wide range of hardness and machinability with a decrease in cutting pressure and an increase in surface finish and tap life.

BACKGROUND OF THE INVENTION

Existing thread cutting taps are generally designed and manufactured to perform within a relatively narrow range of hardness and machinability. This requires the user to maintain an inventory of several taps of the same size to accommodate different substrate materials in order to maximize the performance of the taps and the quality of the female threaded holes. These taps, which include helical flute taps and straight flute taps, often produce poor surface finishes and high cutting pressure. Right or left-handed helical flute taps have one sharp rake angle and one dull rake angle on the thread teeth cutting edges. In both cases, the side opposite the positive rake angle (sharp cutting edge) must be a negative rake angle (dull cutting edge). Negative rake angles increase cutting pressure and drag on the tap leading to tap breakage. Straight flute taps have only 0° rake angles on both upper and lower cutting edges of the thread teeth which also increase cutting pressure that leads to tap breakage.

For the foregoing reasons, there is a need for a device for tapping threads that overcomes the significant shortcomings of the known prior art as delineated hereinabove.

BRIEF SUMMARY OF THE INVENTION

In one aspect, an embodiment of the invention provides a double helix thread cutting tap with both right-handed and left-handed helical chip removal flutes. In one embodiment, the double helix thread cutting tap includes at least two opposing left-handed flutes and two opposing right-handed flutes. The double helix thread cutting tap places a positive rake angle on all sets of thread cutting teeth for optimum performance and minimal cutting pressure. This translates into longer tap life and better surface finishes as well as the ability to cut all substrates with one tap.

The thread cutting tap described herein is capable of cutting both hard and soft metals as well as those that have varying degrees of machinability. This is extremely valuable to the user because of the many different metals, plastics, bones, wood and other substrates that may require female threads to be cut in order to accept a threaded fastener of some type.

In one aspect, the double helix thread cutting tap overcomes the negative aspects of the existing taps, such as high cutting pressure, poor surface finishes, and the need to have a special tap for each type of material to cut threads into. In another aspect, the double helix thread cutting tap effectively reduces cutting pressure by providing sharp cutting edges on alternating upper and lower cutting surfaces of the opposing threaded margins. In yet another aspect, the double helix thread cutting tap makes it possible to cut both hard and soft materials by having low hook angled cutting teeth faces separated by high hook angled cutting teeth faces. In a further aspect, and in addition to benefit of double helix thread cutting tap's improved cutting ability is that it also provides a better surface finish on both upper and lower thread surfaces of the finished female threaded hole. The improved surface finish provides a better contact surface for the fastener which translates into higher clamping forces and resistance to loosening and backing out.

Accordingly, it should be apparent that numerous modifications and adaptations may be resorted to without departing from the scope and fair meaning of the claims as set forth hereinbelow following the detailed description of the invention.

DETAILED DESCRIPTION OF THE INVENTION

Figure 1:
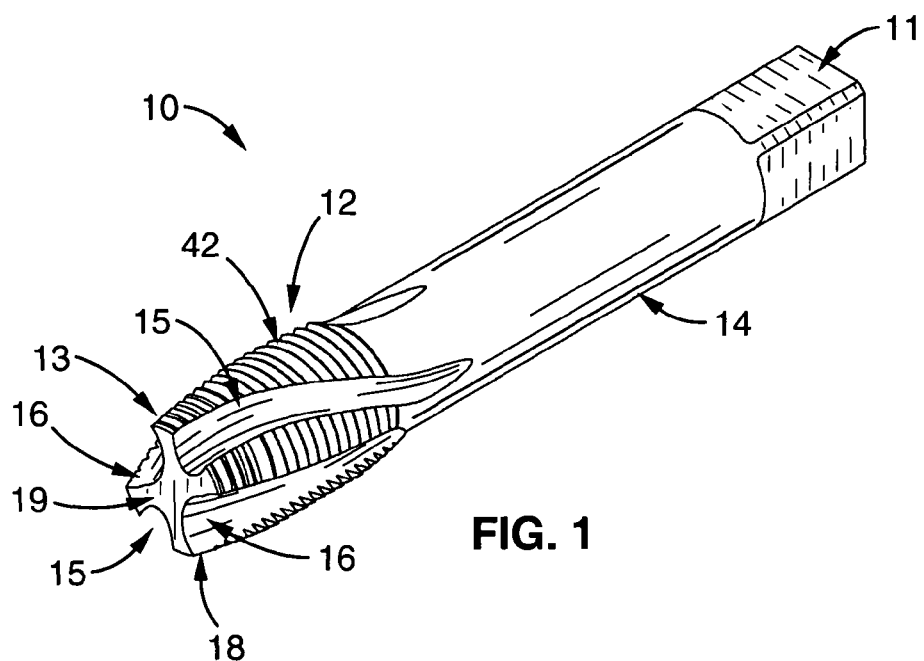
FIG. 1 shows an isometric view of one example of an embodiment of a thread cutting tap with two sets of right-handed, opposing helical chip removal flutes.

The description and figures describe an embodiment of the tap having right-handed cutting surfaces that only cut when rotated in a clockwise direction. In another embodiment, the tap may have left-handed cutting surfaces that only cut when rotated in a counterclockwise direction.

Considering the drawings, wherein like reference numerals denote like parts throughout the various drawing figures, reference numeral 10 is directed to a thread cutting tap.

Figure 2:
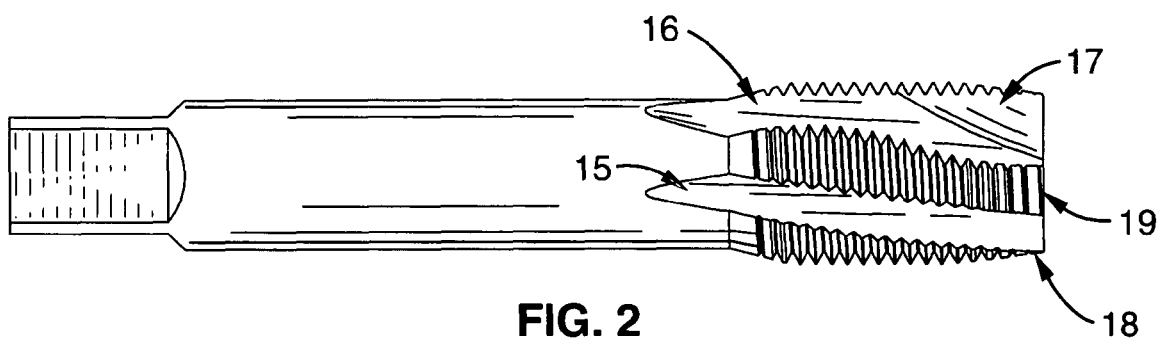
FIG. 2 shows a side view of the tap of FIG. 1 with right-handed helical flutes.
Figure 3:
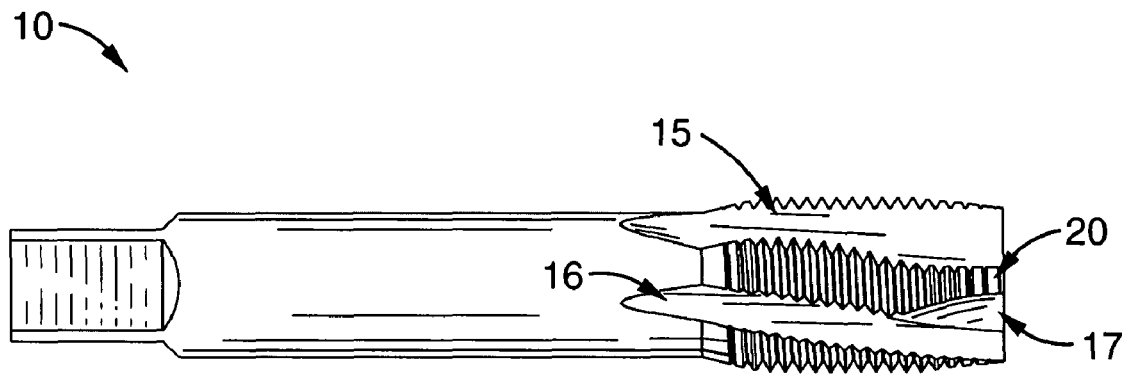
FIG. 3 shows a side view rotated 90 degrees from FIG. 2 with a left-handed helical flute ground into the leading end of the tap intersecting the right-handed helical flute.

As shown in FIGS. 1, 2, and 3, one embodiment of the thread cutting tap 10 is defined by upper driving end 11, intermediate shank 14, threaded portion 12 and bottom end 19. Threaded portion 12, having cutting teeth 42, includes a plurality of right-handed, helical chip removal flutes 15 and 16 dispersed diametrically opposite each other around the circumference of threaded end 12. Cutting edges 13 are form relieved to provide sharpened cutting edges.

FIG. 2 shows right-handed helical flutes 15 and 16 with a starting point at the bottom end 19 and traversing through the threads dissipating into intermediate shank 14 forming cutting edges and chip removal flutes. Flutes 15 are uniform in shape. A front elevation view of partial left-handed helical flute 17 in flute 16 is shown at end 19 of right-handed flutes 16 only. Radial form relief 18 is ground to create land 20 (FIG. 3) located adjacent to end 19 between flutes 15 and 16 to provide cutting edge relief so the tap can begin cutting as it engages the hole to be tapped.

Partial left-handed helical flute 17 (see FIG. 3) is shown in an overhead view at end 19 of right-handed helical flutes 16. Right-handed helical flutes 15 do not contain partial left-handed helical flute 17.

Figure 4:
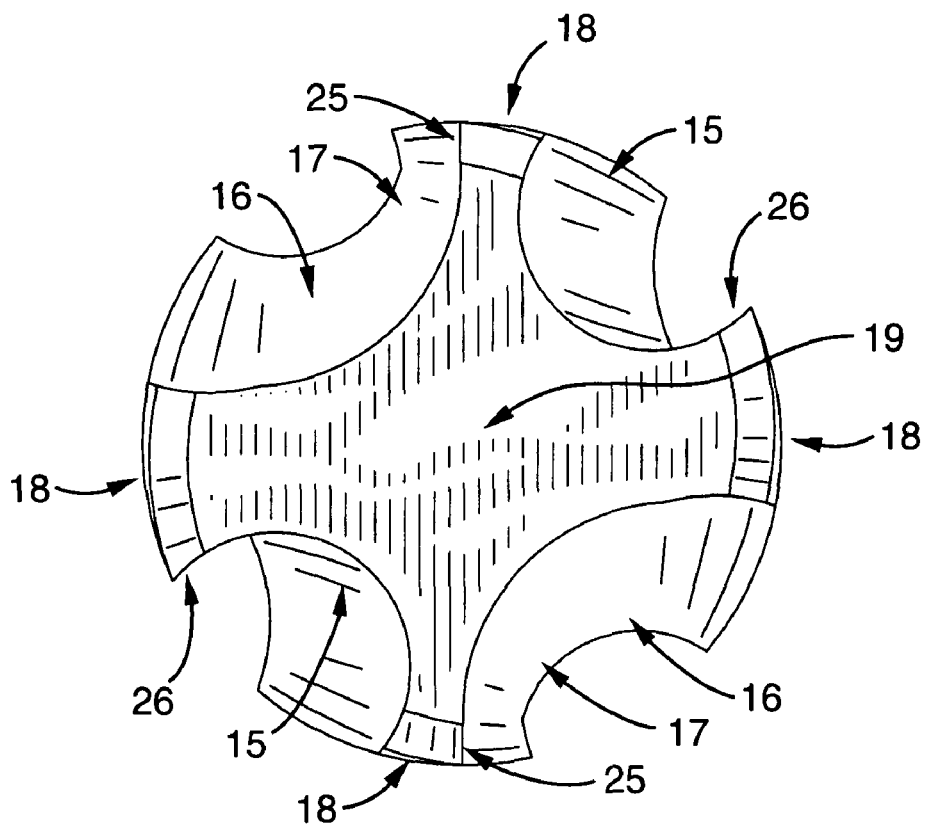
FIG. 4 shows an end view of the tap of FIG. 3 and opposing left- and right-handed helical chip removal flutes with details of the low hook angles and high hook angles of the thread cutting teeth faces.

Right-handed helical flutes 15 (see FIG. 4) are interspersed between right-handed helical flutes 16, such that flutes 15 alternate with flutes 16 around the circumference of threaded portion 12. Only right-handed flutes 16 have additional partial left-handed helical flutes 17 shaped to create cutting edges 25. Right-handed helical flutes 15 create cutting edges 26. Cutting edges 26 of flutes 15 are formed to create a high hook angle (about +7 to about +15°). Partial left-handed helical flute 17 is ground into right-handed helical flute 16 at end 19 to create low hook angles (about 0 to about +5°).

The high hook angle of cutting edge 26 is formed to cut soft materials such as aluminum and soft steel. The low hook angle of cutting edge 25 is formed to cut tougher materials such as cast iron, ductile iron and stainless steel.

Tap 10 includes an equal number of right-handed helical flutes 15 and right-handed helical flutes 16 containing partial left-handed flutes 17. Tap 10 may be made with any number of flutes 15 and flutes 16, as long as there are equal numbers of flutes 15 and flutes 16 and they alternate around threaded portion 12.

Figure 5:
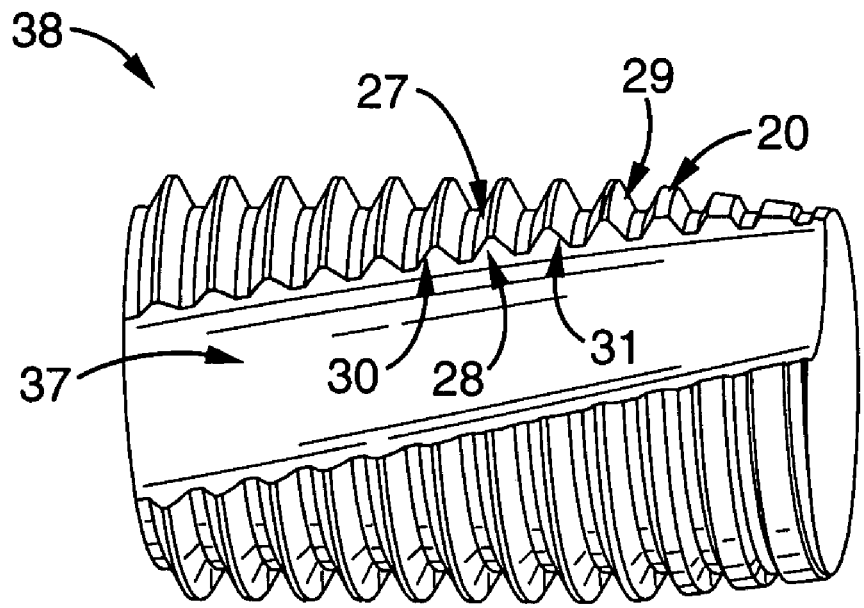
FIG. 5 shows a close-up of a left-handed helical flute with emphasis on the positive rake angle of the upper cutting surfaces of the cutting teeth.

FIG. 5 is for reference only to show a simple view of a left-handed helical chip removal flute 37 cut into threading tap 38, creating upper cutting edges 30 and lower cutting edges 31. Because of the way that helical chip removal flute 37 bisects through the thread teeth at an angle to the longitudinal axis of the tap, upper thread tooth flanks 27 and cutting faces 28 converge, producing upper thread teeth cutting edges 30 which form rake angles less than 90 degrees or sharp cutting edges. This causes the lower thread tooth flanks 29 to converge with cutting faces 28, producing lower thread teeth cutting edges 31 with rake angles greater than 90 degrees or dull cutting edges.

Figure 6:
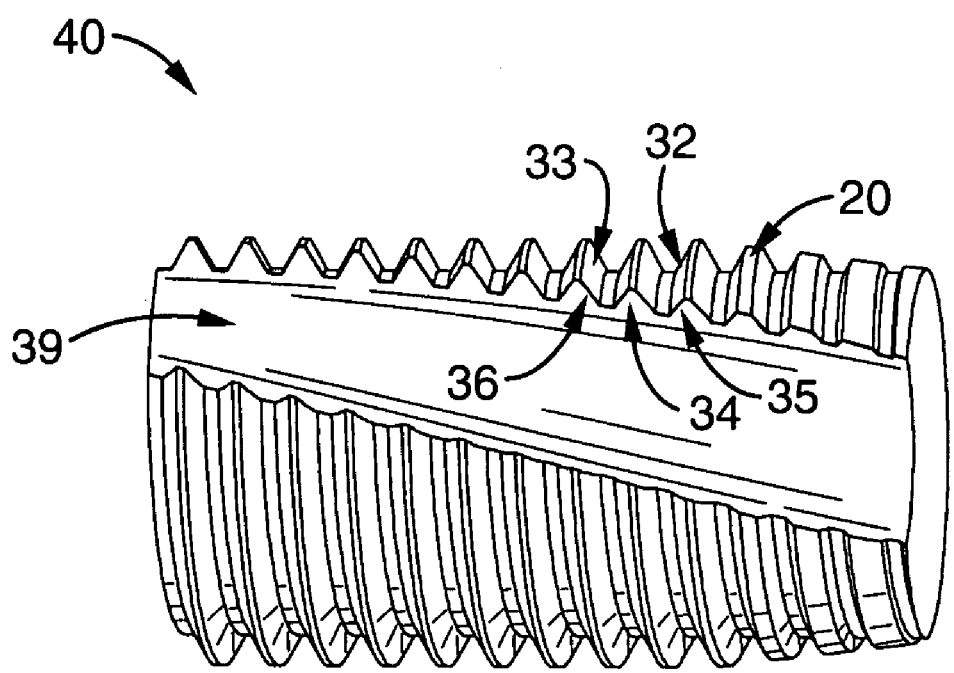
FIG. 6 shows a close-up of a right-handed helical flute with emphasis on the positive rake angle of the lower cutting surfaces of the cutting teeth.

FIG. 6 is for reference only to show a simple view of a right-handed helical chip removal flute 39 cut into threading tap 40, creating upper cutting edges 35 and lower cutting edges 36. Because of the way that right-handed helical chip removal flute 39 bisects through the thread teeth at an angle to the longitudinal axis of the tap, upper thread tooth flanks 32 and cutting faces 34 converge, producing upper thread teeth cutting edges 35 which form rake angles greater than 90 degrees or dull cutting edges. This causes the lower thread tooth flanks 33 to converge with cutting faces 34, producing lower thread teeth cutting edges 36 with rake angles less than 90 degrees or sharp cutting edges.

As described above, tap 10 has a high hook angle on at least two opposing thread teeth faces of the right-handed helical flutes and a low hook angle on at least two opposing thread teeth faces of the partial left-handed helical flutes. With radial relief on all leading edges nearest end 19, tap 10 will cut easier and last longer than existing taps and can be used in most soft substrates, such as bone, plastic, aluminum, brass, and bronze, to harder and tougher substrates, such as stainless steel, cast iron, ductile iron, titanium, and hardened steels.

Thread cutting tap 10 can be used with any thread profile, including, but not limited to, American standard threads, metric threads, Buttress threads, hook threads, dovetail threads, and self locking threads.

Thread cutting tap 10 is used by holding it by shank 14, placing threaded portion 12 into a drilled hole of a preferred diameter and rotating it until the cutting edges dig in and cut the thread form into the side walls of the drilled hole. The rotation continues until tap 10 has succeeded in cutting the preferred thread profile to a desired depth. The rotation is then reversed and tap 10 is backed out of the drilled hole revealing the female helical threads within the drilled hole that can receive a male threaded fastener of a preferred embodiment.

The invention has been described above with the reference to the preferred embodiments. Those skilled in the art may envision other embodiments and variations of the invention that fall within the scope of the claims.

I claim:

1. A tap, comprising:
   an upper driving end;
   a shank below said upper driving end;
   a threaded portion having a length below said shank and terminating in a bottom end, said threaded portion including cutting teeth extending along said length of said threaded portion;
   a plurality of helical flutes extending from said bottom end around a circumference of said threaded portion into said shank, wherein said helical flutes have a twist in a first direction; and
   a partial helical flute contained in at least one of said plurality of helical flutes adjacent said bottom end, wherein said partial helical flute has a twist in a second direction opposite said first direction.

2. The tap of claim 1, wherein said plurality of helical flutes is an even number and wherein said partial helical flute is contained in one-half of said even number of said plurality of helical flutes.

3. The tap of claim 2, wherein each of said plurality of helical flutes that contain said partial helical flute alternates with one of said plurality of helical flutes not containing said partial helical flute.

4. The tap of claim 1, wherein each said helical flute not containing a partial helical flute is shaped to create a cutting edge having a high hook angle.

5. The tap of claim 4, wherein said high hook angle is about 7° to about 15°.

6. The tap of claim 1, wherein each said partial helical flute is shaped to create a cutting edge having a low hook angle.

7. The tap of claim 6, wherein said low hook angle is about 0° to about 5°.

8. The tap of claim 1, wherein said twist in said first direction is a right-handed twist and said twist in said second direction is a left-handed twist.

9. The tap of claim 8, wherein said helical flute having said right-handed twist bisects through said teeth at an angle relative to a longitudinal axis of the tap, forming upper thread teeth cutting edges having rake angles greater than 90° and lower thread teeth cutting edges having rake angles less than 90°.

10. The tap of claim 8, wherein said partial helical flute having said left-handed twist bisects through said teeth at an angle relative to a longitudinal axis of the tap, forming upper thread teeth cutting edges having rake angles less than 90° and lower thread teeth cutting edges having rake angles greater than 90°.

11. The tap of claim 1, wherein said twist in said first direction is a left-handed twist and said twist in said second direction is a right-handed twist.

12. The tap of claim 11, wherein said helical flute having said left-handed twist bisects through said teeth at an angle relative to a longitudinal axis of the tap, forming upper thread teeth cutting edges having rake angles greater than 90° and lower thread teeth cutting edges having rake angles less than 90°.

13. The tap of claim 11, wherein said partial helical flute having said right-handed twist bisects through said teeth at an angle relative to a longitudinal axis of the tap, forming upper thread teeth cutting edges having rake angles less than 90° and lower thread teeth cutting edges having rake angles greater than 90°.

14. A tap, comprising:
an elongated body having upper end and a bottom end; said elongated body extending along a longitudinal axis between said upper end and said bottom end;
a threaded portion having a length above said bottom end of said elongated body, said threaded portion including cutting teeth extending along said length of said threaded portion;
a plurality of helical flutes each formed in an outer periphery of the elongated body at a location interrupting said threaded portion and each extending about the longitudinal axis in a twist in a first direction; and
a partial helical flute contained in at least one of said plurality of helical flutes at a location adjacent said bottom end of said elongated body, each said partial helical flute extending about the longitudinal axis in a twist in a second direction opposite said first direction.

15. The tap of claim 14, wherein said plurality of helical flutes is an even number and wherein said partial helical flute is contained in one-half of said even number of said plurality of helical flutes.

16. The tap of claim 15, wherein each of said plurality of helical flutes that contain said partial helical flute alternates with one of said plurality of helical flutes not containing said partial helical flute.

17. The tap of claim 14, wherein each said helical flute not containing a partial helical flute is shaped to create a cutting edge having a high hook angle and wherein each said partial helical flute is shaped to create a cutting edge having a low hook angle.

18. The tap of claim 14,
wherein said twist in said first direction is a right-handed twist and said twist in said second direction is a left-handed twist;
wherein said helical flute having said right-handed twist bisects through said teeth at an angle relative to the longitudinal axis of the tap, forming upper thread teeth cutting edges having rake angles greater than 90° and lower thread teeth cutting edges having rake angles less than 90°; and
wherein said partial helical flute having said left-handed twist bisects through said teeth at an angle relative to the longitudinal axis of the tap, forming upper thread teeth cutting edges having rake angles less than 90° and lower thread teeth cutting edges having rake angles greater than 90°.

19. The tap of claim 14,
wherein said twist in said first direction is a left-handed twist and said twist in said second direction is a right-handed twist;
wherein said helical flute having said left-handed twist bisects through said teeth at an angle relative to the longitudinal axis of the tap, forming upper thread teeth cutting edges having rake angles greater than 90° and lower thread teeth cutting edges having rake angles less than 90°; and
wherein said partial helical flute having said right-handed twist bisects through said teeth at an angle relative to the longitudinal axis of the tap, forming upper thread teeth cutting edges having rake angles less than 90° and lower thread teeth cutting edges having rake angles greater than 90°.

20. A tap, comprising:
an upper driving end;
a shank below said upper driving end;
a threaded portion having a length below said shank and terminating in a bottom end, said threaded portion including cutting teeth extending along said length of said threaded portion;
at least one first helical flute having a twist in a first direction and extending from said bottom end around a circumference of said threaded portion into said shank;
at least one second helical flute having a twist in said first direction and extending from said bottom end around a circumference of said threaded portion into said shank; and
a partial helical flute contained in said second helical flute adjacent said bottom end, said partial helical flute having a twist in a second direction opposite said first direction.

21. The tap of claim 20, wherein the number of said at least one first helical flute is equal to the number of said at least one second helical flute.

22. The tap of claim 21, wherein said first helical flute alternates with said second helical flute.

23. The tap of claim 20, wherein each said first helical flute is shaped to create a cutting edge having a high hook angle and wherein each said partial helical flute is shaped to create a cutting edge having a low hook angle.

24. The tap of claim 20,
wherein said twist in said first direction is a right-handed twist and said twist in said second direction is a left-handed twist;
wherein said helical flute having said right-handed twist bisects through said teeth at an angle relative to a longitudinal axis of the tap, forming upper thread teeth cutting edges having rake angles greater than 90° and lower thread teeth cutting edges having rake angles less than 90°; and
wherein said partial helical flute having said left-handed twist bisects through said teeth at an angle relative to the longitudinal axis of the tap, forming upper thread teeth cutting edges having rake angles less than 90° and lower thread teeth cutting edges having rake angles greater than 90°.

25. The tap of claim 20,
wherein said twist in said first direction is a left-handed twist and said twist in said second direction is a right-handed twist;
wherein said helical flute having said left-handed twist bisects through said teeth at an angle relative to a longitudinal axis of the tap, forming upper thread teeth cutting edges having rake angles greater than 90° and lower thread teeth cutting edges having rake angles less than 90°; and
wherein said partial helical flute having said right-handed twist bisects through said teeth at an angle relative to the longitudinal axis of the tap, forming upper thread teeth cutting edges having rake angles less than 90° and lower thread teeth cutting edges having rake angles greater than 90°.

* * * * *